US010562058B2

(12) United States Patent
Hayama et al.

(10) Patent No.: US 10,562,058 B2
(45) Date of Patent: Feb. 18, 2020

(54) COATING APPARATUS

(71) Applicant: HONDA MOTOR CO., LTD., Tokyo (JP)

(72) Inventors: Hironobu Hayama, Tochigi (JP);
Kimihide Tabata, Tochigi (JP);
Takeshi Nabeta, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/548,195

(22) PCT Filed: Feb. 1, 2016

(86) PCT No.: PCT/JP2016/052949
§ 371 (c)(1),
(2) Date: Aug. 2, 2017

(87) PCT Pub. No.: WO2016/125751
PCT Pub. Date: Aug. 11, 2016

(65) Prior Publication Data
US 2018/0029061 A1 Feb. 1, 2018

(30) Foreign Application Priority Data
Feb. 3, 2015 (JP) .................................. 2015-019590

(51) Int. Cl.
*B05B 13/04* (2006.01)
*B05B 15/70* (2018.01)
(Continued)

(52) U.S. Cl.
CPC .......... *B05B 15/70* (2018.02); *B05B 13/0405* (2013.01); *B05B 13/0421* (2013.01);
(Continued)

(58) Field of Classification Search
USPC .................................. 118/321, 323; 901/43
See application file for complete search history.

(56) References Cited

U.S. PATENT DOCUMENTS 3,791,590 A * 2/1974 Dieter ....................... B05B 1/28
222/501
5,165,961 A * 11/1992 Freeman ................. B05C 11/10
118/323
(Continued)

FOREIGN PATENT DOCUMENTS

JP S46-14923 5/1971
JP H04-63163 2/1992
(Continued)

OTHER PUBLICATIONS

International Search Report, dated Jun. 21, 2016 (Jun. 21, 2016), 2 pages.
(Continued)

*Primary Examiner* — Yewebdar T Tadesse
(74) *Attorney, Agent, or Firm* — Rankin, Hill & Clark LLP

(57) ABSTRACT

A nozzle unit 22 is attached to a mounting portion 15 of a coating apparatus 10 through a support portion 21. The nozzle unit 22 can move along an arc-shaped guide portion 29 provided on the support portion 21. The guide portion 29 maintains a tip of a nozzle 31 at a center position of the arc shape and supports the nozzle unit 22 such that the nozzle unit 22 can move along the arc shape.

2 Claims, 6 Drawing Sheets

(51) Int. Cl.
    *B25J 11/00*     (2006.01)
    *B05C 5/02*     (2006.01)
    *B25J 15/00*     (2006.01)

(52) U.S. Cl.
    CPC ......... *B05C 5/0216* (2013.01); *B25J 11/0075* (2013.01); *B25J 15/0019* (2013.01); *B05B 13/0431* (2013.01)

(56) References Cited

U.S. PATENT DOCUMENTS

| | | | |
|---|---|---|---|
| 6,206,963 | B1 * | 3/2001 | Abrahams ............ B05C 5/0245 118/300 |
| 2005/0066890 | A1 | 3/2005 | Wetzel |
| 2011/0162805 | A1 | 7/2011 | Cheng |
| 2016/0067732 | A1 | 3/2016 | Nakamura |

FOREIGN PATENT DOCUMENTS

| | | |
|---|---|---|
| JP | H04-111788 | 4/1992 |
| JP | H11-67624 | 3/1999 |
| JP | 2000-079366 | 3/2000 |
| JP | 2007-117922 | 5/2007 |
| JP | 2010-104945 | 5/2010 |
| JP | 2010-253376 | 11/2010 |
| JP | 2010-253439 | 11/2010 |
| JP | 2011-115707 | 6/2011 |
| JP | 5535381 | 7/2014 |
| JP | 2016-055250 | 4/2016 |
| WO | 2010/123097 | 10/2010 |

OTHER PUBLICATIONS

Chinese Office Action dated Oct. 10, 2018, 6 pages.
Japanese Office Action dated Jul. 10, 2018, 3 pages.

* cited by examiner

COATING APPARATUS

TECHNICAL FIELD

The present invention relates to a coating apparatus which applies a liquid material such as a sealing agent.

BACKGROUND ART

For a vehicle body plate or the like of a body of an automobile, two vehicle body plates are laminated in some cases. In such a case, even when the accuracy of each of the vehicle body plates to be laminated is within a tolerance range, a gap is formed between an end portion of one of the vehicle body plates and a surface of the other vehicle body plate due to combined allowable errors. If the gap remains opened, there is a problem that the part gets rusty, or the appearance is impaired when the gap can be seen from the outside of the vehicle body. Therefore, the gap is coated with a sealing agent to prevent the rust and improve the appearance.

An example of a coating apparatus which applies liquid material, such as a sealing agent, to an object to be coated includes, for example, a coating apparatus described in Patent Literature 1, the coating apparatus comprising: a nozzle unit provided with a nozzle; and a nozzle rotation mechanism which rotates the nozzle unit. In Patent Literature 1, even when the direction of a surface to be coated is changed, the nozzle rotation mechanism rotates the nozzle unit to discharge the liquid material from the nozzle while the posture of the nozzle is maintained such that the center line of the nozzle is perpendicular to the surface to be coated.

CITATION LIST

Patent Literature

Patent Literature 1: Japanese Patent Laid-Open No. 2010-253376

SUMMARY OF INVENTION

Technical Problem

The coating apparatus described in Patent Literature 1 rotates the nozzle unit to change the direction of the nozzle tip to maintain the posture of the nozzle such that the center line of the nozzle is perpendicular to the surface to be coated. However, when the direction of the surface to be coated is changed, and the nozzle unit is rotated according to the change, the nozzle is also rotated, and the top position of the nozzle is changed. Therefore, control needs to be performed to move the nozzle unit such that the nozzle tip faces the surface to be coated. When the control is performed, the nozzle tip may be deviated from the position before the rotation, and the liquid material cannot be applied to an appropriate position if the position is deviated.

The present invention has been made in view of the circumstances, and an object of the present invention is to provide a coating apparatus which can apply liquid material to an appropriate position even when a direction of a nozzle tip which discharges the liquid material is changed.

Solution to Problem

The present invention provides a coating apparatus comprising: a nozzle unit including a nozzle configured to discharge a liquid material; a support portion including a guide portion formed in an arc shape, the support portion configured to maintain a tip of the nozzle at a certain position and configured to support the nozzle unit such that the nozzle unit can move along the arc shape of the guide portion; a nozzle unit movement mechanism configured to move the nozzle unit; and a transport unit configured to transport the support portion to apply the liquid material discharged from the nozzle to an object.

According to the present invention, the nozzle unit including the nozzle moves along the arc shape of the guide portion while the support portion maintains the tip of the nozzle at the certain position. Therefore, even when the nozzle unit is moved to change the direction of the nozzle tip, the nozzle is maintained at the certain position with respect to the transport unit, and the liquid material can be discharged from the nozzle to an appropriate position.

When a robot including a plurality of drivable arms is used as the transport unit, the mounting portion is provided on the arm at the tip among the plurality of arms, and the support portion is mounted on the mounting portion. In this case, the nozzle is maintained at the certain position with respect to the mounting portion of the robot even when the nozzle unit is moved to change the direction of the nozzle.

It is preferable that the nozzle be directional, and the nozzle unit comprise a nozzle rotation mechanism configured to rotate the nozzle about a central axis.

Since the nozzle is directional and can rotate about the central axis, the discharge direction can be changed.

It is preferable that the nozzle unit support the nozzle such that the nozzle can move back and forth.

Since the nozzle can move back and forth, the nozzle is retracted when the nozzle tip comes into contact with the object. This can prevent damage of the nozzle.

It is preferable that the support portion support the nozzle unit such that the nozzle unit can move in a range of a central angle of 100°0 in the arc shape of the guide portion.

Since the moving range of the nozzle unit is in the range of the central angle of 100° in the arc shape of the guide portion, the configuration can be simpler than when the range is 360°.

Effect of Invention

According to the present invention, the liquid material can be applied to an appropriate position even when the direction of the nozzle tip which discharges the liquid material is changed.

DESCRIPTION OF EMBODIMENT

Hereinafter, an embodiment of the present invention will be described with reference to the drawings.

Figure 1:
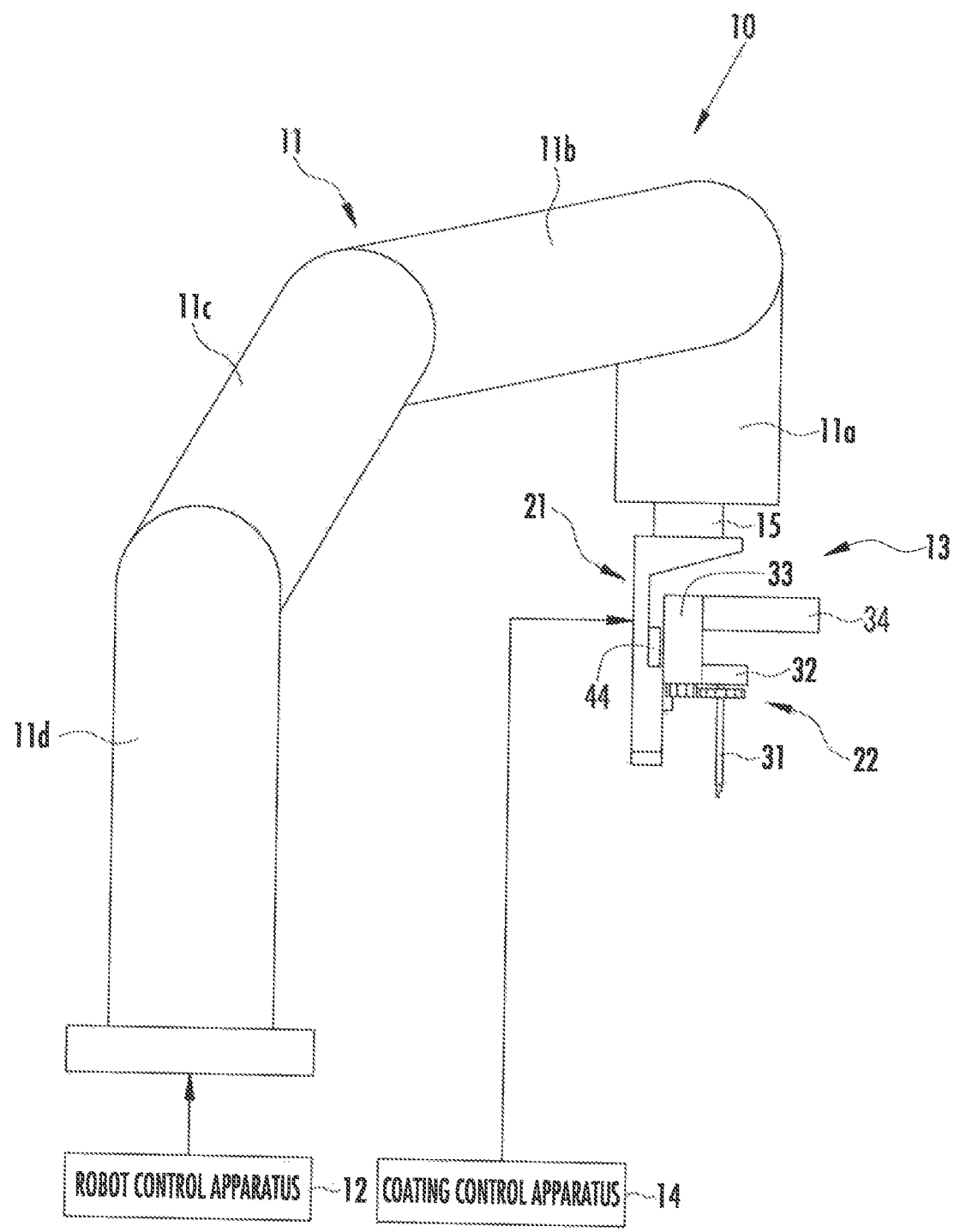
FIG. 1 is a side view showing a coating apparatus of the present invention.

As shown in FIG. 1, a coating apparatus 10 includes a coating robot 11, a robot control apparatus 12, a coating unit 13, and a coating control apparatus 14.

The coating robot 11 is, for example, a multi-axis articulated robot and is provided with arms 11a to 11d in order from the tip. The coating robot 11 is provided with a plurality of motors (not shown) which drive joints (not shown) of each of the arms 11a to 11d, and the drive is controlled by the robot control apparatus 12.

A mounting portion 15 is attached to the arm 11a closer to the tip of the coating robot 11, and the coating unit 13 is attached to the mounting portion 15.

The robot control apparatus 12 drives the plurality of motors of the coating robot 11 to drive the arms 11a to 11d to move the coating unit 13 attached to the mounting portion 15 to a position facing an object to be coated.

Figure 2:
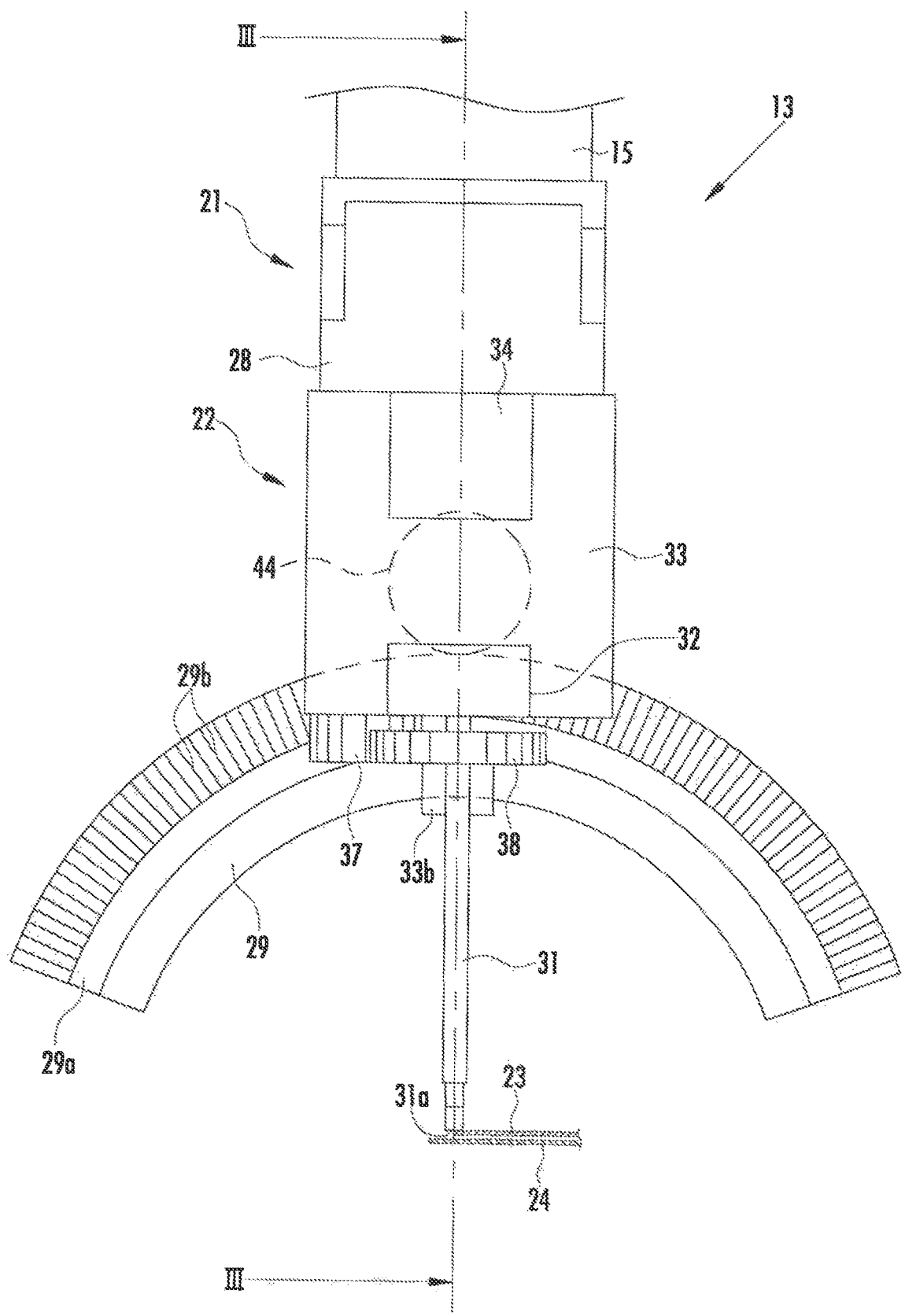
FIG. 2 is a front view showing a coating unit.

As shown in FIG. 2, the coating unit 13 includes a support portion 21 and a nozzle unit 22. The coating unit 13 applies a sealing agent 25 (see FIG. 4) to, for example, a space between two vehicle body plates 23 and 24 configuring a vehicle body.

The support portion 21 includes: a fixing portion 28 attached to the mounting portion 15 of the coating robot 11; and a guide portion 29 formed at a lower end of the fixing portion 28. The guide portion 29 is formed in, for example, an arc shape with a central angle of 140°.

An arc-shaped guide groove 29a for moving the nozzle unit 22 along the arc shape of the guide portion 29 is formed on a front surface of the guide portion 29. A rack gear 29b is formed above the guide groove 29a on the front surface of the guide portion 29.

Figure 3:
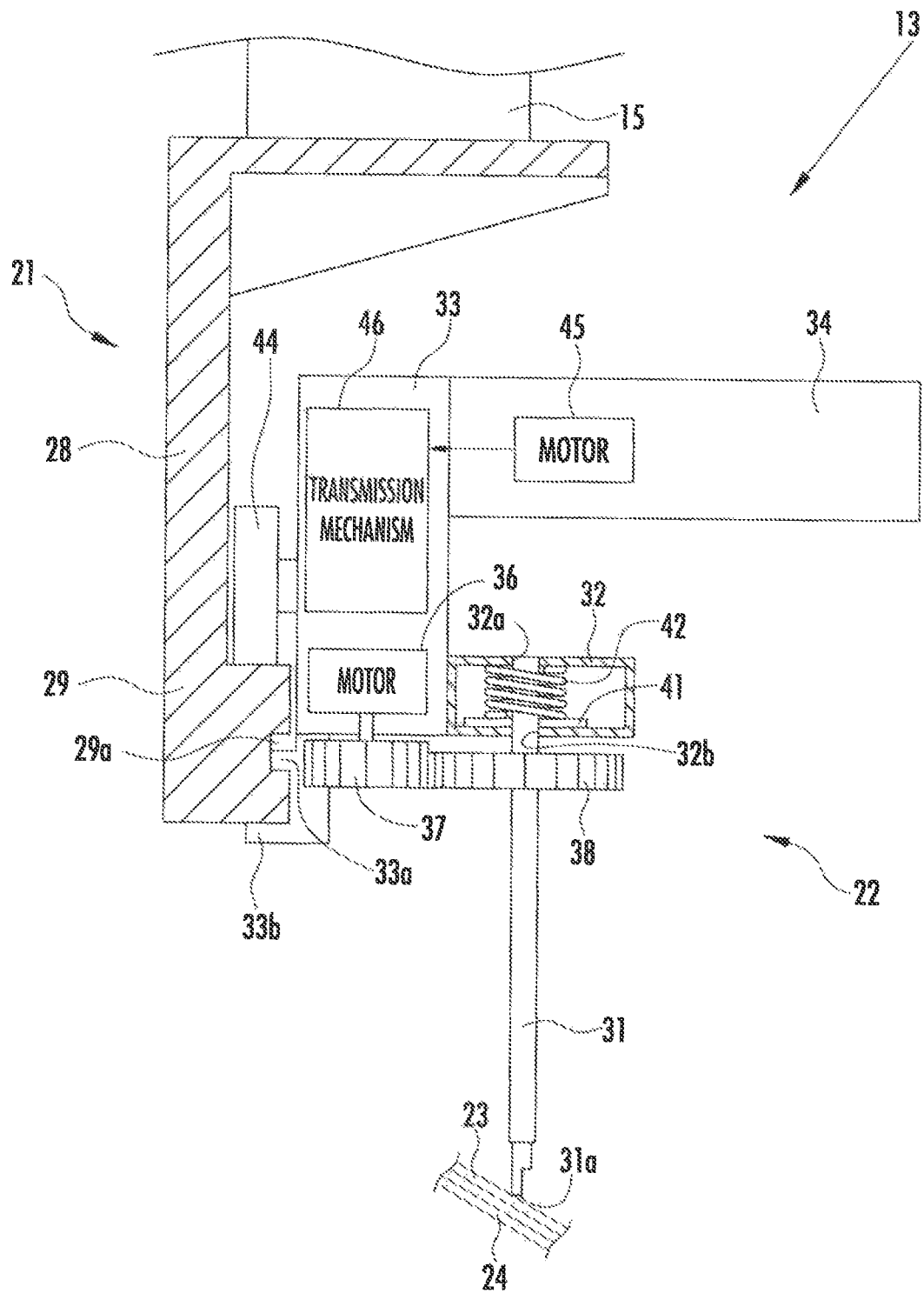
FIG. 3 is a cross-sectional view taken along line showing the coating unit.

As shown in FIG. 3, the nozzle unit 22 includes: a nozzle 31; a main body portion 33 including a nozzle support portion 32 which supports the nozzle 31 such that the nozzle 31 can rotate; and a coupling portion 34 protruding from an upper part of the main body portion 33. Note that FIG. 3 illustrates a cross section of only the support portion 21 and the nozzle support portion 32, and the sealing agent 25 is not illustrated.

The nozzle 31 is configured to discharge the sealing agent 25, and a nozzle port 31a at the tip is formed in a rectangular shape and is directional. The nozzle 31 discharges the sealing agent 25 while the nozzle 31 is in contact with the vehicle body plate 23. The nozzle 31 is set such that a central axis of the nozzle 31 is perpendicular to the surface of the vehicle body plate 23 in front view (FIG. 2). Note that a left and right direction in FIG. 2 is a longitudinal direction of the nozzle port 31a. Furthermore, the central axis of the nozzle 31 may be inclined with respect to the surface of the vehicle body plate 23 in front view (FIG. 2).

An upper part of the nozzle 31 is inserted into support holes 32a and 32b formed on the nozzle support portion 32, and the nozzle 31 is supported by the nozzle support portion 32 such that the nozzle 31 can rotate about the central axis and can move back and forth with respect to the nozzle support portion 32.

A motor 36 is arranged inside of the main body portion 33, and a first gear 37 connected to the motor 36 is attached to a lower surface of the main body portion 33 such that the first gear 37 can rotate. The first gear 37 is meshed with a second gear 38 attached to the upper part of the nozzle 31. The rotation of the motor 36 is transmitted to the second gear 38 through the first gear 37, and this rotates the nozzle 31 provided with the second gear 38.

A holding plate 41 is attached to the upper part of the nozzle 31. The holding plate 41 is arranged in the nozzle support portion 32. The holding plate 41 holds a lower end of a coil spring 42 into which the nozzle 31 is inserted. An upper end of the coil spring 42 is in contact with an inner surface of an upper plate of the nozzle support portion 32, and the nozzle 31 is biased in a direction of protrusion (downward in FIG. 3) by the coil spring 42. When the nozzle 31 is biased in the direction of protrusion, there is a gap between the second gear 38 and a lower surface of the nozzle support portion 32 and the main body portion 33, and the nozzle 31 can be retracted.

The vehicle body plates 23 and 24 include a convex portion different from a designed shape, and when the convex portion pushes the tip of the nozzle 31, the nozzle 31 is retracted against the bias of the coil spring 42. This can prevent damage of the nozzle 31 even when the nozzle 31 is pushed by the convex portion of the vehicle body plates 23 and 24. Note that the spring may not be provided, and the weight of the nozzle 31 may cause the nozzle 31 to protrude.

A first hook portion 33a engaged with the guide groove 29a of the guide portion 29 and a second hook portion 33b brought into contact with a lower surface of the guide portion 29 are formed on the main body portion 33. A roller 44 is also attached to the main body portion 33 such that the roller 44 can rotate. The roller 44 is in contact with an upper surface of the guide portion 29.

As the first hook portion 33a is engaged with the guide groove 29a of the guide portion 29, the nozzle unit 22 can move along the arc shape of the guide portion 29. As the second hook portion 33b is brought into contact with the lower surface of the guide portion 29, and the roller 44 is brought into contact with the upper surface of the guide portion 29, thereby determining the position of the nozzle unit 22 in the up and down direction with respect to the guide portion 29.

A supply tube (not shown) of a sealing agent supply apparatus is coupled to the coupling portion 34. The supply tube is connected to a supply channel (not shown) provided inside of the coupling portion 34, and the sealing agent 25 supplied from the sealing agent supply apparatus is supplied to the nozzle 31 through the supply tube, the supply channel of the coupling portion 34, and a supply channel (not shown) provided inside of the main body portion 33.

Figure 4:
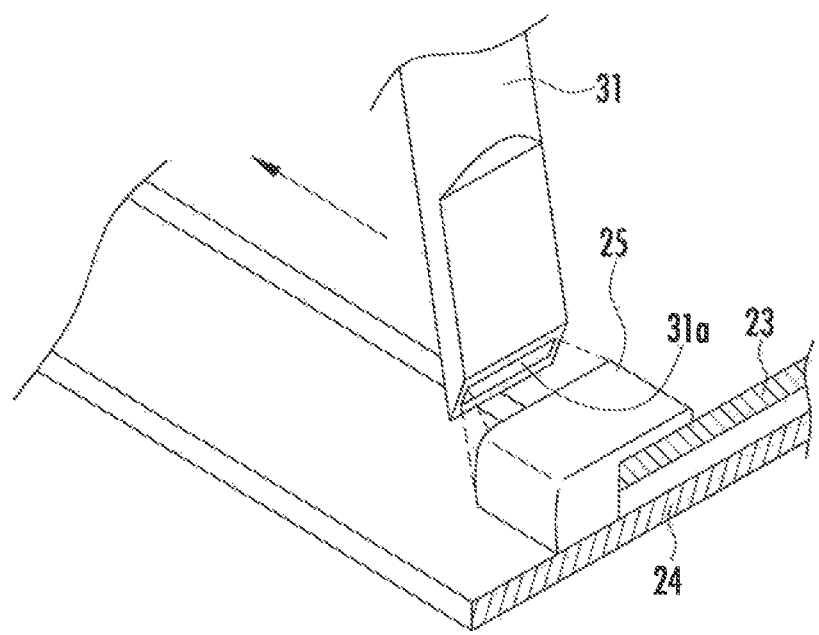
FIG. 4 is a perspective view showing a nozzle and vehicle body plates.

As shown in FIG. 4, to allow the nozzle 31 to discharge the sealing agent 25 while the nozzle 31 is in contact with the vehicle body plate 23, the nozzle 31 comes into contact with the vehicle body plate 23 with the nozzle port 31a being inclined relative to the surface of the vehicle body plate 23. When the sealing agent 25 is discharged from the nozzle port 31a toward the uneven portion of the vehicle body plates 23 and 24 in this state, the discharged sealing agent 25 fills the gap between the vehicle body plates 23 and 24.

Figure 5:
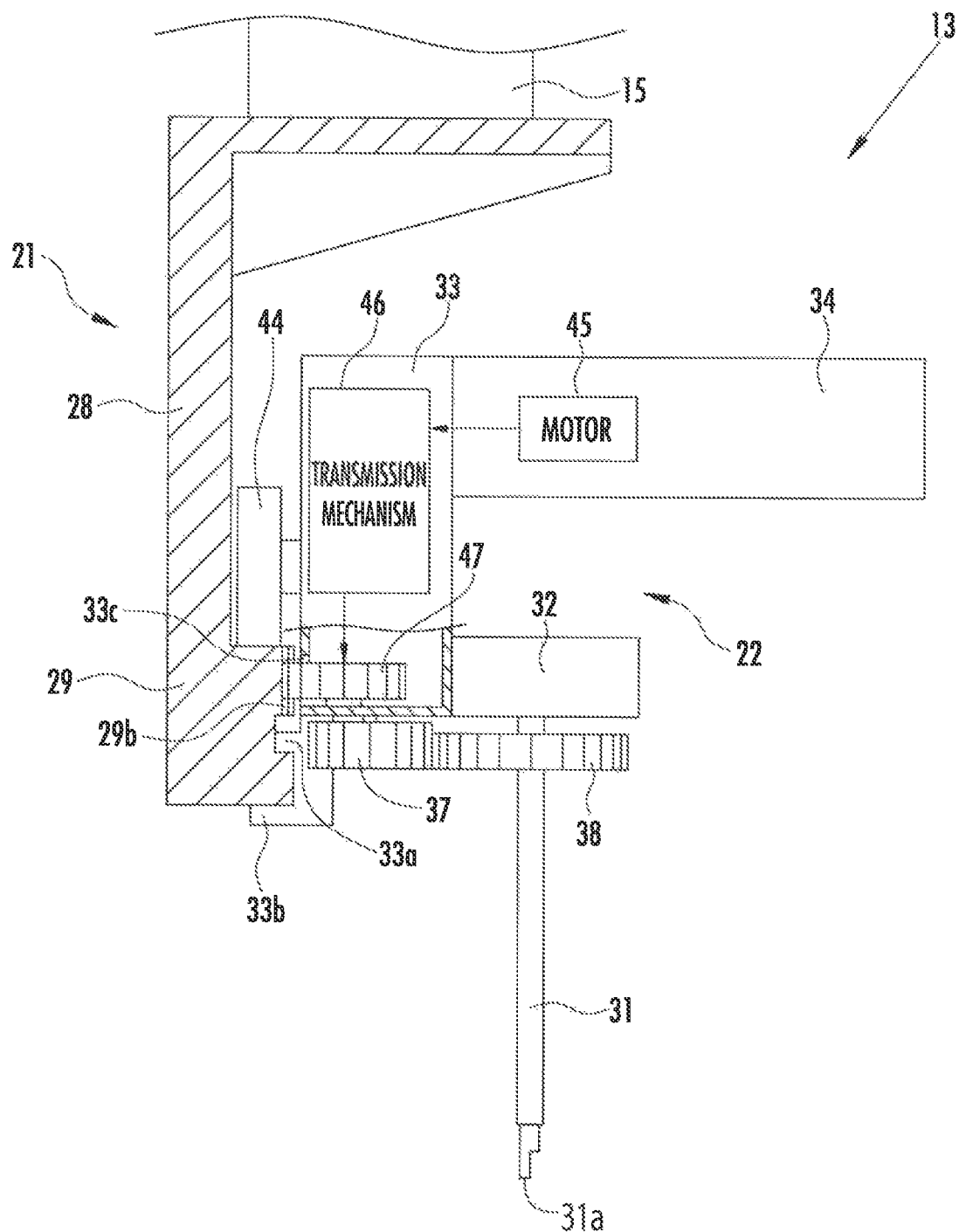
FIG. 5 is a cross-sectional view showing the coating unit.

As shown in FIG. 5, the coupling portion 34 is provided with a motor 45. The main body portion 33 is provided with: a transmission mechanism 46 which transmits rotation output of the motor 45; and a movement gear 47 meshed with the rack gear 29b of the guide portion 29. The transmission mechanism 46 includes a gear, a warm gear, or the like and transmits the driving force of the motor 45 to the movement gear 47. An opening 33c for exposing the movement gear 47 and causing the movement gear 47 to be meshed with the rack gear 29b, is formed on a back surface of the main body portion 33. Note that FIG. 5 illustrates a cross section of only a part of the support portion 21 and the main body portion 33 and does not illustrate the vehicle body plates 23 and 24 and the sealing agent 25.

The drive of the motor 45 rotates the movement gear 47 through the transmission mechanism 46. The movement gear 47 is meshed with the rack gear 29b of the guide portion 29, and the rotation of the movement gear 47 moves the nozzle unit 22 including the main body portion 33 provided with the movement gear 47 along the arc shape of the guide portion 29.

The tip of the nozzle 31 substantially coincides with the center of the arc shape of the guide portion 29 in front view. Therefore, the tip position of the nozzle 31 is maintained at a certain position, and the nozzle unit 22 moves (rotates) about the tip of the nozzle 31.

In the present embodiment, the nozzle unit 22 can move between a left position rotated (moved) 50° counterclockwise along the arc shape of the guide portion 29 from the center position shown in FIG. 2 and a right position rotated (moved) 50° clockwise along the arc shape of the guide portion 29 from the center position. The nozzle unit 22 moves in a range of a central angle of 100° of the central angle of 140° in the arc shape of the guide portion 29, Note that the moving range can be appropriately changed.

When the coating apparatus 10 applies the sealing agent 25 to the gap between the vehicle body plates 23 and 24, an operator operates an operation panel (not shown) to input coating execution data for driving the motors 36 and 45 of the coating robot 11 and the coating unit 13. The robot control apparatus 12 drives the coating robot 11 based on the coating execution data and sets the coating unit 13 attached to the mounting portion 15 at a desired position as shown in FIG. 1.

Next, as shown in FIG. 2, the coating control apparatus 14 drives the motor 45 of the nozzle unit 22 based on the coating execution data to rotate the movement gear 47 through the transmission mechanism 46 to move the nozzle unit 22 to a desired position along the arc shape of the guide portion 29. The coating control apparatus 14 further drives the motor 36 of the nozzle unit 22 to rotate the nozzle 31 to rotate the nozzle port 31a in a desired direction (orientation), Note that the desired position of the nozzle unit 22 is a position where the tip surface of the nozzle 31 comes into contact with the end portion of the vehicle body plate 23. The desired direction of the nozzle 31 is a direction in which the longitudinal direction (left and right direction in FIG. 2) of the nozzle port 31a of the nozzle 31 is over both the vehicle body plates 23 and 24 at the uneven portion of the vehicle body plates 23 and 24.

Once the nozzle 31 is set at the desired position and direction, the sealing agent supply apparatus is driven to supply the sealing agent 25 to the nozzle 31. As shown in FIG. 4, the sealing agent 25 sent to the nozzle 31 is discharged from the nozzle port 31a of the nozzle 31 toward the vehicle body plates 23 and 24. The discharged sealing agent 25 tills the gap between the vehicle body plates 23 and 24.

Figure 6:
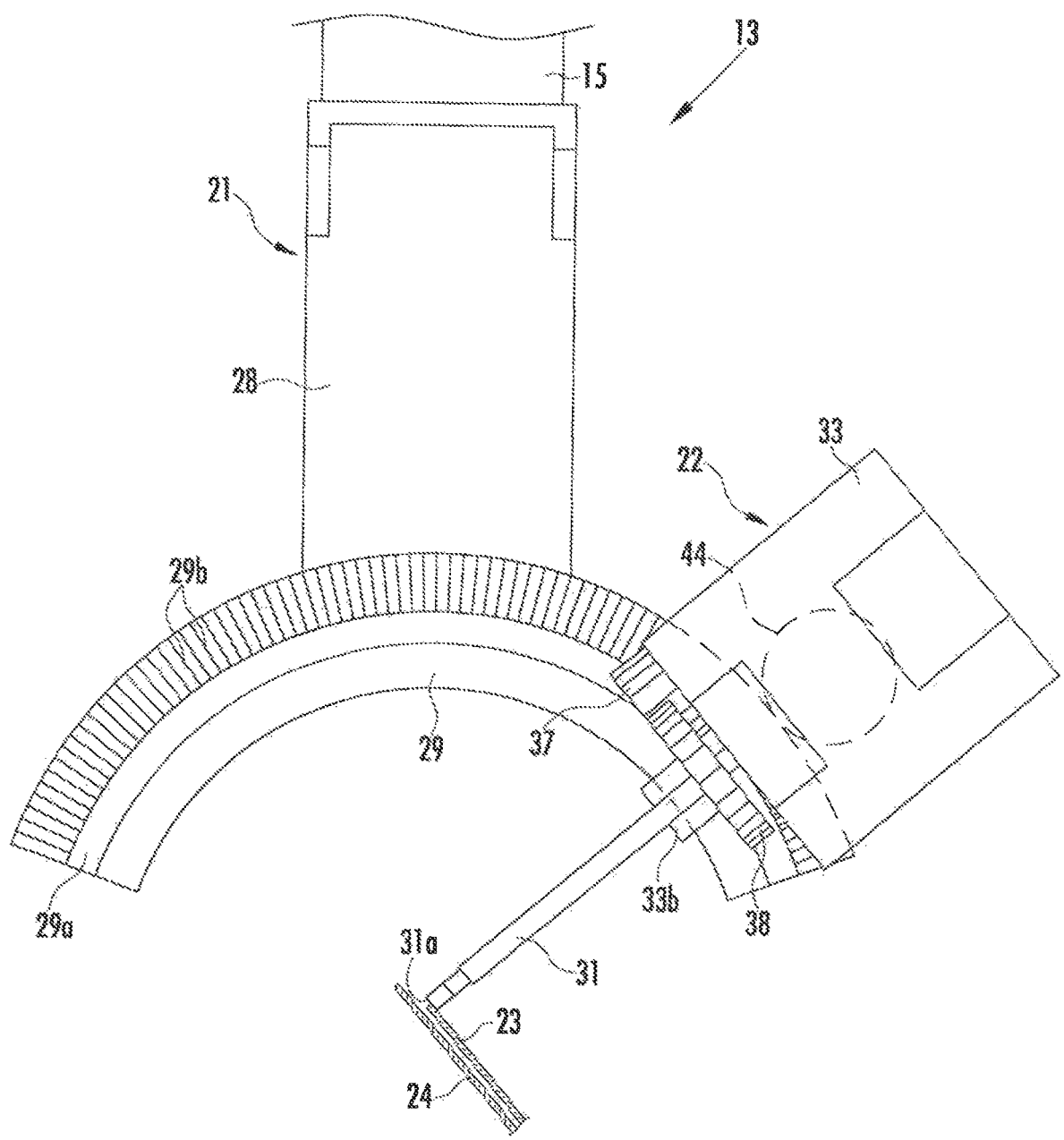
FIG. 6 is a front view showing the coating unit with a rotating body positioned at a right position.

When the direction of the vehicle body plates 23 and 24 is changed as shown in FIG. 6, the coating control apparatus 14 drives the motor 45 of the nozzle unit 22 based on coating execution data corresponding to the change to move the nozzle unit 22 along the arc shape of the guide portion 29 so that the tip surface of the nozzle 31 faces the vehicle body plates 23 and 24.

Since the direction of the nozzle 31 is changed according to the direction of the vehicle body plates 23 and 24, the tip position of the nozzle 31 is maintained at the certain position, and the nozzle unit 22 moves along the arc shape of the guide portion 29 even when the nozzle unit 22 is moved. That is, the tip position of the nozzle 31 does not change even When the direction of the nozzle 31 is changed. Therefore, the sealing agent 25 can be discharged from the nozzle 31 toward the coating target position of the vehicle body plates 23 and 24 even when the nozzle unit 22 is moved to change the direction of the nozzle 31.

In the present embodiment, the nozzle 31 is maintained at the certain position with respect to the mounting portion 15 of the coating robot 11 even when the nozzle unit 22 is moved to change the direction of the tip of the nozzle 31. That is, the coating robot 11 does not have to be driven to move the mounting portion 15 even when the nozzle unit 22 is moved. As a result, the coating execution data for driving the coating robot 11 is simple coating execution data for moving the mounting portion 15 while maintaining the mounting portion 15 at the certain position with respect to the surface to be coated, and the coating execution data can be easily and automatically calculated from the design data of the object to be coated. Therefore, the coating execution data can be simplified in the present embodiment compared to the conventional coating apparatus, in which the nozzle is also moved when the nozzle unit is moved, and repositioning control for driving the robot again to cause the nozzle tip to face the surface to be coated needs to be performed every time the tip position of the nozzle is changed.

Furthermore, when the repositioning control is performed in the conventional coating apparatus, the nozzle tip may be deviated from the desired position. In this case, the operator needs to manually operate the operation panel to drive the robot to adjust the position of the nozzle tip, and this is time-consuming and reduces the time efficiency. The position of the nozzle tip does not have to be adjusted in the present embodiment, and the workload of the operator can be reduced to improve the time efficiency.

In the embodiment, the coating apparatus is driven based on the coating execution data which automatically changes the direction of the nozzle tip when the direction of the surface to be coated is changed. However, even if the operator manually operates the operation panel to drive the coating apparatus so as to move the nozzle unit to change the direction of the nozzle tip when the direction of the surface to be coated is changed, the coating robot does not have to be driven to adjust the position of the nozzle tip. Therefore, the workload of the operator can be reduced, and the time efficiency can be improved.

Although the nozzle discharges the sealing agent while the nozzle is in contact with the vehicle body plates in the embodiment, a space may be provided between the nozzle and the vehicle body plates.

Although the nozzle used in the embodiment is directional, a nozzle without directivity may also be used. The material discharged from the nozzle is not limited to the sealing agent as long as the material is a liquid material.

Although the motor, the transmission mechanism, the movement gear, and the rack gear of the guide portion move the nozzle unit in the embodiment, it is only necessary that the nozzle unit can be moved. For example, a roller may be rotated while the roller is pressed against the guide portion, and the nozzle unit may be moved by the frictional force of the roller and the guide portion.

REFERENCE SIGNS LIST

10 . . . coating apparatus, 11 . . . coating robot, 12 . . . robot control apparatus, 13 . . . coating unit, 14 . . . coating control apparatus, 15 . . . mounting portion, 21 . . . support portion, 22 . . . nozzle unit, 23, 24 . . . vehicle body plates, 25 . . . sealing agent, 28 . . . fixing portion, 29 . . . guide portion, 29a . . . guide groove, 29b rack gear, 31 . . . nozzle, 31*a* . . . nozzle port, 32 . . . nozzle support portion, 32*a*, 32*b* . . . support holes, 33 . . . main body portion, 33*a*, 33*b* . . . first and second hook portions, 33*c* . . . opening, 34 . . . coupling portion, 36, 45 . . . motors, 37, 38 . . . first and second gears, 41 . . . holding plate, 42 . . . coil spring, 44 . . . roller, 46 . . . transmission mechanism, 47 . . . movement gear

The invention claimed is:

1. A coating apparatus comprising:
    a nozzle unit including a nozzle configured to discharge a liquid material and a nozzle support portion which supports the nozzle;
    a support portion including a guide portion formed in an arc shape, the support portion configured to maintain a tip of the nozzle at a certain position while supporting the nozzle unit such that the nozzle unit can move along the arc shape of the guide portion;
    a nozzle unit movement mechanism including a nozzle unit movement motor operably connecting the nozzle unit and the support portion to move the nozzle unit along the arc shape of the guide portion; and
    a transport unit configured to transport the support portion to apply the liquid material discharged from the nozzle to an object,
    wherein
    the nozzle is asymmetrical about a central axis of the nozzle,
    the nozzle unit comprises: a nozzle rotation mechanism including a nozzle rotation motor operably engaging the nozzle to rotate the nozzle about the central axis relative to the nozzle support portion; a holding plate attached to the nozzle; an upper plate portion of the nozzle support portion provided opposite to and spaced from the holding plate in the direction of the central axis of the nozzle; and a biasing member arranged between the holding plate and the upper plate portion of the nozzle support portion and contacting the upper plate portion of the nozzle support portion at one end, and the other end being received by the holding plate, the biasing member biasing the holding plate with the nozzle toward the tip of the nozzle in the direction of the central axis of the nozzle so as to bias the nozzle to which the holding plate is attached toward the tip of the nozzle in the direction of the central axis of the nozzle.

2. The coating apparatus according to claim 1, wherein the support portion supports the nozzle unit such that the nozzle unit can move in a range of a central angle of 100° in the arc shape of the guide portion.

\* \* \* \* \*